United States Patent [19]

Adams et al.

[11] Patent Number: 4,547,342
[45] Date of Patent: Oct. 15, 1985

[54] LIGHT WEIGHT WELDED ALUMINUM INFLATOR

[75] Inventors: Gary V. Adams, Perry; Wilbur J. Ahlf, Ogden; Donald J. Cunningham, North Ogden; David P. Dahle, Logan, all of Utah

[73] Assignee: Morton Thiokol, Inc., Chicago, Ill.

[21] Appl. No.: 595,774

[22] Filed: Apr. 2, 1984

[51] Int. Cl.[4] .................................. C01B 21/02
[52] U.S. Cl. .......................... 422/166; 422/167; 422/305; 222/3; 137/68.2; 102/531; 280/741
[58] Field of Search .............. 422/120, 165–167, 422/240, 305; 222/3; 280/736, 737, 740, 741; 137/68 A; 102/531

[56] References Cited

U.S. PATENT DOCUMENTS

| | | | |
|---|---|---|---|
| 3,951,428 | 4/1976 | Sugiura et al. | 137/68 A |
| 3,985,076 | 10/1976 | Schneiter et al. | 422/166 |
| 3,986,456 | 10/1976 | Doiw et al. | 422/305 |
| 4,116,466 | 9/1978 | Gehrig | 280/736 |
| 4,131,299 | 12/1978 | Ono et al. | 280/736 |
| 4,249,673 | 2/1981 | Katoh et al. | 422/305 |
| 4,278,638 | 7/1981 | Nilsson et al. | 422/166 |
| 4,296,084 | 10/1981 | Adams et al. | 422/166 |
| 4,424,914 | 1/1984 | Brown, Jr. | 137/68 A |

Primary Examiner—David L. Lacey
Attorney, Agent, or Firm—Gerald K. White

[57] ABSTRACT

A gas generator or inflator particularly for the inflation of inflatable protective bags that are used in vehicle safety systems includes first and second aluminum structural components. The first component, a diffuser shell having outlet ports, includes integrally formed concentric cylinders which define chambers containing ignition materials, a solid gas generant composition and filters and provide ports for the passage of generated gases from chamber to chamber and then through the outlet ports. The second component, a base shell, has an attachment flange, includes an initiator, and is provided with three concentric surfaces that mate with the ends of the concentric cylinders of the first component. The three concentric cylinders of the first component are simultaneously joined with the concentric mating surfaces of the second component by a single inertia welding operation.

11 Claims, 3 Drawing Figures 4,547,342

LIGHT WEIGHT WELDED ALUMINUM INFLATOR

BACKGROUND OF THE INVENTION

1. Field of the Invention

This invention relates to gas generators or inflators that utilize the combustion of a solid fuel gas generant composition for the generation of a gas for rapidly inflating vehicle passive restraint inflatable crash protection bags, and more particularly, to an improved housing construction for such inflators.

2. Description of the Prior Art

Many forms of gas generators or inflators that utilize combustible solid fuel gas generant compositions for the inflation of inflatable crash protection or "air" bag restraint systems are known in the prior art. One form of such gas generators includes as its main component parts an annular reaction or combustion chamber which is bounded by an outer casing or housing structure, as disclosed in U.S. Pat. No. 4,296,084, granted to G. V. Adams and F. E. Schneiter and assigned to the assignee of the present invention. The combustion chamber encloses a rupturable container or cartridge that is hermetically sealed and contains therein solid gas generant material in pelletized form, surrounded by an annular filter. The generator further includes a central ignition or initiator tube, and a toroidal filter chamber adjoining and encircling the combustion chamber with an inner casing or housing structure in close surrounding and supporting relationship to the rupturable container, the inner casing being formed by a cylinder having uniformly spaced peripheral ports or orifices near one end. These orifices provide exit holes for the flow of inflation gas from the combustion chamber.

Gas generators or inflators must withstand enormous thermal and mechanical stresses for a short period during the gas generation process. Thus, inflators that have been and are currently being used to fill automobile or other vehicle crash bags are fabricated using steel for the casing and other housing structural components, with the structural components being joined together by screw threads, roll crimping or welding.

Recent emphasis on weight reduction in automobiles has created a need, and a demand, for a lighter weight crash bag inflation system. This is of particular importance in a system for driver crash protection where the inflator is mounted on the steering wheel since the availability of a lighter weight inflator enables a reduction to be made in the weight of the steering wheel and steering column on which the inflator is mounted. It has been determined that the most significant weight reductions in the inflator can be achieved by the substitution of aluminum for the steel housing and other structural components, aluminum already being used internally in the inflator as containers, seals and filter media.

SUMMARY OF THE INVENTION

An object of the invention is to provide an improvement in the housing construction for an inflator of the type described in U.S. Pat. No. 4,296,084, an improvement that facilitates the substitution of aluminum for the steel structural components thereof used heretofore, and thereby enables a significant reduction in the weight of the inflator to be made.

Another object of the invention is to provide such an improved inflator housing construction which meets the high reliability standards of a safety device and at the same time can be manufactured in high production rates at low cost.

In accomplishing these and other objectives of the invention, there is provided for the inflator a housing construction comprising first and second aluminum structural components or shells, specifically, a first or diffuser shell and a second or base shell. Both shells are forged, heat treated, and then final machined. The first structural component or diffuser shell has three integrally formed concentric cylinders which form the inflator structural walls and define chambers therein containing the solid fuel or gas generant, ignition materials, and filters, and provide exit openings or port holes for the passage of the inflation gases from chamber to chamber and into the protective air bag.

The second structural component or base shell contains an electric initiator and attachment flange and also provides three concentric mating surfaces for the concentric cylinders of the diffuser shell. In accordance with the invention, the three concentric cylinders of the diffuser shell are simultaneously joined to the concentric mating surfaces of the base shell by a single inertia welding operation.

BRIEF DESCRIPTION OF THE DRAWING

Having summarized the invention, a detailed description of the invention follows with reference being made to the accompanying drawings which form part of the specification, of which.

DESCRIPTION OF THE PREFERRED EMBODIMENT

Figure 1:
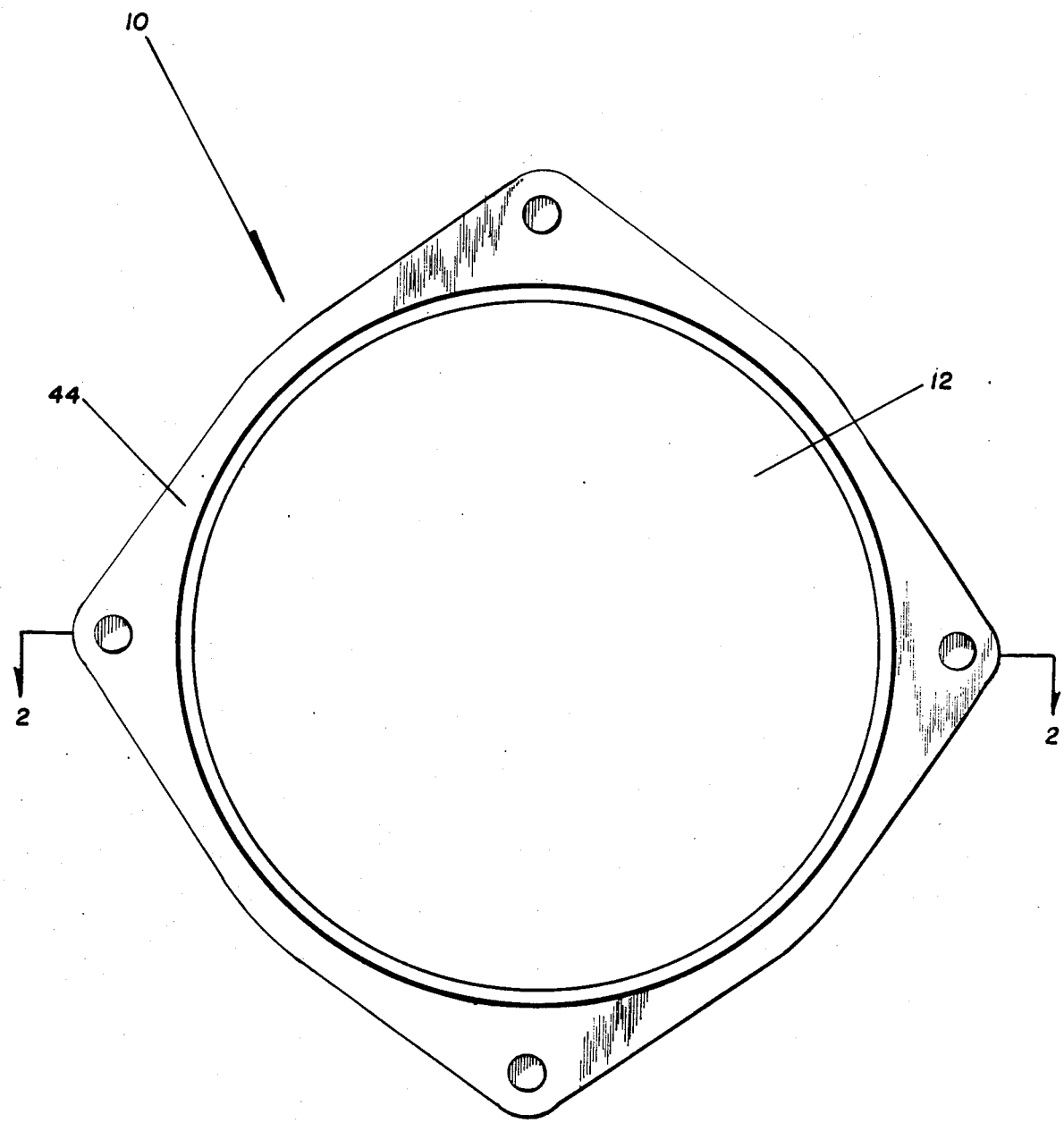
FIG. 1 is a top plan view of an improved inflator embodying the present invention.
Figure 2:
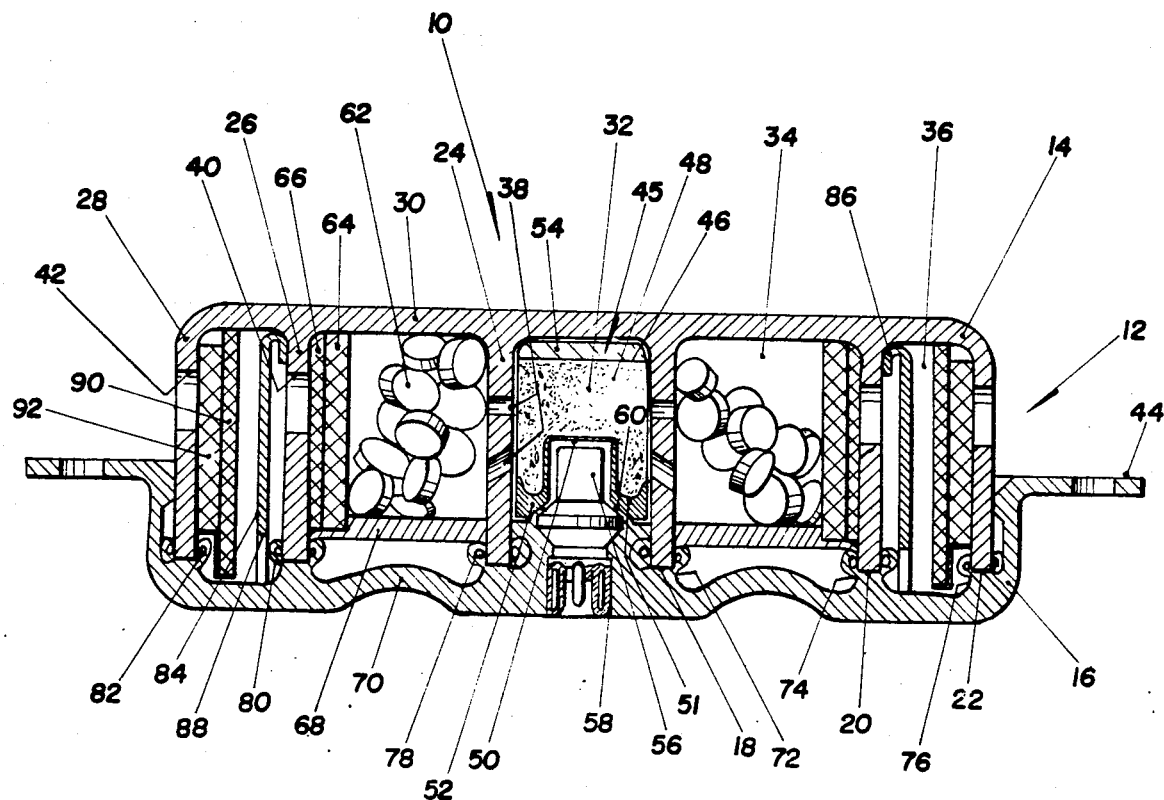
FIG. 2 is a cross sectional view of the inflator of FIG. 1 taken along the lines 2—2 of FIG. 1.

The gas generator or inflator assembly 10 according to the present invention has a generally cylindrical external outline, as shown in FIGS. 1 and 2, and includes a housing construction 12 comprising two structural components. The two structural components, as shown in FIG. 2, comprise an upper shell or diffuser 14 and a lower shell or base 16 which are joined by three concentric inertia welds shown at 18, 20 and 22 to form the housing construction 12 of the inflator assembly 10. A feature of the invention is that the three inertia welds 18, 20 and 22 are performed simultaneously in a single inertia welding operation.

The diffuser 14 may be formed by forging with three concentric cylinders 24, 26 and 28, each of which cylinders extend downwardly from a common flat upper wall 30 of the diffuser 14 to form a separate weld interface with the base 16. The inner cylinder 24, in cooperation with wall 30 and base 16, forms a cylindrical igniter chamber 32. The intermediate cylinder 26, in cooperation with the inner cylinder 24, wall 30, and base 16, forms an inner chamber having the shape of a toroid, specifically, a combustion chamber 34. The outer cylinder 28, in cooperation with the intermediate cylinder 26, wall 30, and base 16, forms an outer chamber 36 that also has the shape of a toroid. Cylinders 24, 26 and 28 each include a plurality of uniformly spaced exhaust openings or ports 38, 40 and 42, respectively, through which the generated or inflation gas flows into a protective air bag (not shown) to be filled. The base 16 includes an interface attachment flange 44 which is used to attach the inflator assembly 10 to a vehicle the occupants of which are to be protected.

Positioned within the igniter chamber 32 is an igniter charge assembly 45 comprising a rupturable closed aluminum container 46 containing igniting material 48. Container 46 may be hermetically sealed against moisture, has a recess or cavity 50 formed in the bottom 51 thereof, and is retained in chamber 32 by a retaining ring 52. Retaining ring 52 has a shape conforming to the bottom 51 of container 46 including recess 50 and may be inserted in the end of chamber 32 in press fit relation therewith. At the top end thereof, container 46 is held in spaced relation with the inner surface of wall 30 by cushion/spacer material 54 which desirably may comprise a cerafiber material.

Although various pyrotechnic materials may be employed for igniter material 48, a preferred material is a granular mixture of 25% by weight of boron and 75% of potassium nitrate. This mixture has been found to burn with a very hot flame that is suitable for igniting the solid fuel gas generant material employed in the inflator assembly 10, as described hereinafter.

Extending into recess 50 of container 46 is an initiator 56. Initiator 56, as shown, has a conically shaped lower portion and is mounted in a hole 58 having a mating conically shaped upper portion, the hole 58 being provided at a central location in base 16. Initiator 56 is retained in hole 58 by a crimp 60 that is formed in base 16 at the upper end of hole 58 and which overlaps and engages the conically shaped upper portion of initiator 56. Initiator 56 may be a conventional electric squib having a pair of energizing electrical terminals (not shown) that are adapted for plug-in connection to external crash sensor means (not shown).

Contained within the toroidal combustion chamber 34 are uniformly distributed pellets 62 of a gas generant composition which may be any one of a number of compositions meeting the requirements of burning rate, nontoxicity, and flame temperature. One composition that may be utilized is that described in U.S. Pat. No. 4,203,787 granted to Fred E. Schneiter and George F. Kirchoff. Another composition that may advantageously be utilized is that described in U.S. Pat. No. 4,369,079 granted to Graham C. Shaw, which patent is assigned to the assignee of the present invention.

Pellets 62 are surrounded by an annular inner screen pack or combustion chamber filter 64. Inner screen pack 64, as shown in FIG. 2, may desirably include a layer 66 of coarse screen adjacent to the inner surface of concentric cylinder 26. An aluminum washer-shaped retaining ring or disk 68 holds the gas generant pellets 62 and inner screen pack 64 in place and away from the base 16 during the inertia welding operation.

In the embodiment of the invention shown in FIG. 2, the internal surface of the base 16 includes a circular rounded ridge 70. This ridge 70 serves to reduce the free volume of combustion chamber 34. Additionally, during functioning of inflator assembly 10, ridge 70 provides support for the retainer disk 68.

Figure 3:
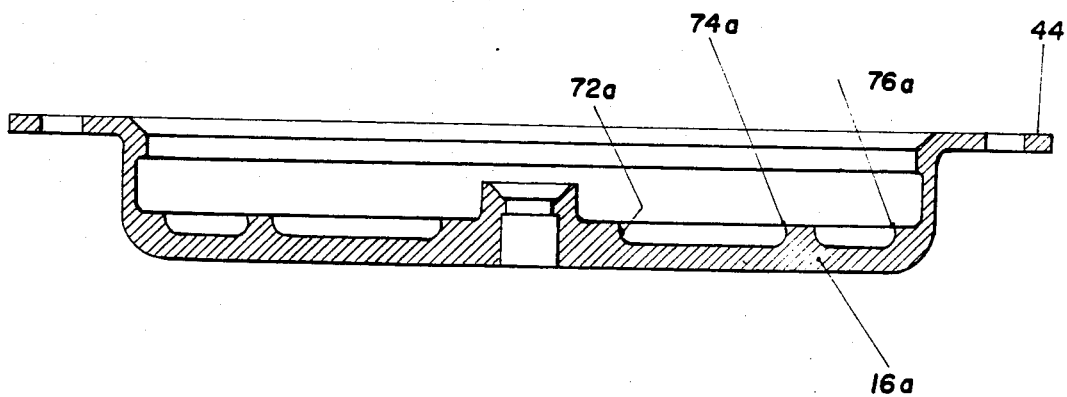
FIG. 3 is a sectional view showing an optional flat base configuration for the inflator of FIG. 1.

In FIG. 3, an optional flat base configuration is illustrated that may be employed for the base 16 in the inflator assembly 10 in which the ridge 70 has been eliminated. This flat base configuration allows additional volume in combustion chamber 34 for an increased load of gas generant pellets 62 when such is needed or required.

As shown in FIG. 2, the concentric interface regions of base 16 that mate with the three concentric cylinders 24, 26 and 28 comprise short concentric-like stubs 72, 74 and 76, respectively. Similar stubs 72a, 74a and 76a are provided in the invention embodiment of FIG. 3 as the mating interfaces of base 16a for the concentric cylinders 24, 26 and 28.

It is noted that during the formation of the inertia welds 18, 20 and 22, flashing indicated respectively at 78, 80 and 82 is formed around the ends of the concentric cylinders 24, 26 and 28 in each of the invention embodiments.

In the outer toroidal chamber 36, as seen in FIG. 2, an aluminum deflector ring 84 is provided. Deflector ring 84 is formed with an inwardly directed curved flange 86 at its upper end and has a plurality of uniformly spaced exhaust openings or ports 88 adjacent the bottom end thereof. Ring 84 has a length at least as long as concentric cylinder 26 and is positioned in embracing relation with the latter with flange 86 in press fit engagement with the outer surface of cylinder 26 at the inner end thereof and engaging weld flash 80 at the outer end thereof. Also included in the toroidal chamber 36 is an outer screen pack or filter 90. Screen pack 90 may desirably include a coarse layer 92 adjacent the inner surface of cylinder 28.

In accordance with the invention, the housing construction 12 provides a structure for containing the high pressure inflation gases which are produced by combustion of the gas generant pellets 62. Functioning of the inflator assembly 10 begins with an electrical signal from a crash sensor (not shown) to the initiator 56. The initiator fires into and pierces the closed aluminum container 46 that holds the igniter material 48. The igniter material 48 burns and bursts through the walls of the container 46 and flows through the exit openings 38 in the inner cylinder 24 and into the toroidal combustion chamber 34. The hot igniter gases ignite the gas generant pellets 62 which releases the nitrogen inflator gases. These gases flow through the inner screen filter pack 64 and radially outward through the combustion chamber exit openings 40. The screen filter pack 64 serves to cool the inflator gases and to remove particulate residue therefrom. As the gases exit the combustion chamber openings 40, they are turned downward, as seen in FIG. 2, by deflector ring 84 where they strike flashing 80 from the intermediate cylinder inertia weld 20. The flashing 80 serves to interrupt the gas flow which helps to further remove particulate matter from the exhaust gases. The inflation gases then flow radially outward through openings 88 in the deflector ring 84 and up into the annular space between deflector ring 84 and outer screen pack 90, through the latter, and finally radially outward through the exit openings or port holes 42. The outer screen pack 90 serves to further cool the exhaust gases and remove particulate matter.

Further in accordance with the invention, the inflator is welded in the wholly loaded condition. During the inertia welding operation, the assembly of the loaded diffuser 14 containing the igniter material 48, gas generant pellets 62, inner screen pack 64, retaining ring 68, deflector ring 84, and outer screen pack 90 is held stationary in the inertia welding machine. Aluminum retaining ring 68 holds the gas generant pellets 62 and inner screen pack 64 in place and also serves to keep them separated from the spinning base 16 during the inertia welding process.

In the inertia welding process, the base 16 is rotated beneath the loaded diffuser 14 by power driven clutch means (not shown) to a speed, typically of about 3000 r.p.m. Upon the attainment of such speed, the clutch is actuated to disconnect the power source and the freely spinning base 16 is raised upward to bring the concentric stubs 72, 74 and 76 into contact with the lower ends of a respectively associated one of the three concentric cylinders 24, 26 and 28 of the diffuser 14. The resulting friction stops the spinning in a fraction of a second of the base 16 but raises the temperature at the areas of contact sufficiently to cause consolidation thereat of the metal of the diffuser 14 and base 16. Pressure is maintained for a short period, for example, a second or two, to allow the welds 18, 20 and 22 to solidify.

During the welding process, flashing 78, 80 and 82 is created at the interface between the respective cylinders 24, 26 and 28 and the base 16. For improving the structural integrity of the welded assembly, the weld interface on the base 16, as shown in FIG. 2, is raised or "stubbed" away from the base inner surface. The weld flashing 78 from the inner cylinder 24 and the weld flashing 80 from the intermediate cylinder 26 are utilized to retain the aluminum retaining ring or disk 68 in place.

Thus, there has been provided, in accordance with the invention, an improvement in housing construction for inflators which facilitates the substitution of aluminum for the steel structural components of the prior art and which meets the high reliability standards required of a safety device and at the same time can be manufactured in high production rates to effect a low cost. Features important in these connections and embodied in the present invention are listed below:

1. The three concentric cylinders 24, 26 and 28 of the diffuser 14 are simultaneously joined to the base by inertia welds formed by a single inertia welding operation.
2. All weld flash is contained internally of the housing construction 12.
3. Weld flash is used to retain filter assemblies and to reduce particulate levels in effluent gases.
4. High strength 7000 series aluminum can be reliably welded by the inertia welding method. Other aluminum alloys are also acceptable.
5. The weld surfaces in the base 16 have been "stubbed" away from the flat inner surface thereof to improve structural capability.
6. An aluminum retainer ring or disk 68 is used to keep the gas generant pellets 62 and the inner screen pack 64 away from the spinning base 16 during inertia welding.
7. Optional configurations may be employed for the base 16:
   (a) Curved to reduce free volume in the combustion chamber and to provide support for the retainer disk 68.
   (b) Flat to allow additional volume for an increased load of gas generant pellets 62 when such is required.
8. Ignition material 48 is placed in preformed container 46 which interfaces with the initiator 56 mounted in the base 16.

While initiator 56 has been described herein as being a conventional electric squib associated with an external crash sensor, it will be understood that, if desired, an initiator and crash sensor of the types described and claimed in the copending application of George L. Stevens bearing Ser. No. 569,861, filed on Jan. 11, 1984, (case 1164-22-00) and assigned to the assignee of the present invention, may be substituted for the initiator 56 and the sensor associated therewith. With such a modified arrangement, the initiator and crash sensor would both be contained in the base shell 16 and require no external connection thereto, the initiator being a percussion responsive type and the sensor comprising an inertial mass.

What is claimed is:

1. An inflator for the generation of gas to inflate vehicle inflatable crash protection bags comprising,
    a solid gas generant composition which is operable upon ignition to produce gas and combustion products,
    ignition means to ignite said gas generant composition,
    initiator means to actuate said ignition means,
    filter means to cool said gas and to trap said combustion products, and
    first and second structural components,
    said first structural component having three concentric cylinders which extend from a common wall means and define three concentric chambers with the inner chamber containing said ignition means, the intermediate chamber containing said gas generant composition, and the outer chamber containing said filter means, and with outlet ports in the outer one of said cylinders for the outflow of generated gas and with other ports in the inner cylinders for the passage of generated gas from chamber to chamber and then through the outlet ports in the outer cylinder,
    said second structural component containing said initiator means, having an attachment flange, and providing concentric mating surfaces for the concentric cylinders of said first structural component, the concentric cylinders of said first structural component being welded to the concentric mating surfaces of said second structural component.

2. An inflator as defined in claim 1 wherein said first and second structural components are formed of aluminum.

3. An inflator as defined in claim 2 wherein the chambers defined by said concentric cylinders and said wall means of said first structural component comprise a central cylindrical chamber and surrounding concentric inner and outer toroidal chambers, said ignition means being contained in said central chamber, said gas generant composition in said inner toroidal chamber, and said filter means in said outer toroidal chamber, and
    wherein said second structural component includes a hole at a central location thereof for mounting said initiator.

4. An inflator as defined in claim 3 including a closed container, said closed container containing said ignition means and having a recess formed in a portion thereof facing said second structural component, and
    wherein said initiator means in said second structural component extends into the recess of said closed container.

5. An inflator as defined in claim 4 including cushion/spacer material, said closed container being positioned in spaced relation with said wall means of said first component by said cushion/spacer material.

6. An inflator as defined in claim 4 including an inner annular screen filter pack positioned in said inner toroidal chamber in surrounding relation with said gas generant composition therein, said inner screen pack being operative to remove particulate matter from the generated gas, and further including an annular retaining disk for holding the said gas generant composition and said inner screen filter pack in said inner toroidal chamber away from the second structural component to facilitate the joining of said second structural component to said first structural component.

7. An inflator as defined in claim 6 wherein said annular retaining disk is made of aluminum.

8. An inflator as defined in claim 6 including an outer annular screen filter pack positioned in said outer toroidal chamber against the inner surface of the outer one of the three concentric cylinders, said outer screen filter pack being operative to remove particulate matter from and to cool the inflation gas.

9. An inflator as defined in claim 8 including an annular deflector ring positioned between said outer annular screen filter pack and the outer surface of the intermediate one of the three concentric cylinders, said deflector ring having a length that is at least as long as said intermediate concentric cylinder and being positioned at one end in contacting relation with said common wall means, the other end of said deflector ring having port holes therein for the passage of generated gas.

10. An inflator as defined in claim 9, wherein said second structural component is welded to said first structural component with weld flash being formed adjacent the mating concentric surface of the intermediate one of said concentric cylinders and the associated mating surface of said second structural component during the welding operation, wherein gases exiting the inner toroidal chamber are deflected by said deflector ring toward the end thereof having port holes therein and are caused to strike said weld flash, such weld flash serving to interrupt and break up the gas flow thereby to remove particulate matter from the inflation gas.

11. An inflator as defined in claim 1 wherein said first and second structural components are formed of aluminum, wherein the chambers defined by said concentric cylinders and said wall means of said first structural component comprise a central cylindrical chamber and surrounding concentric inner and outer toroidal chambers, said ignition means being contained in said central chamber, said gas generant composition in said inner toroidal chamber, and said filter means in said outer toroidal chamber, wherein said initiator means is positioned in said second structural component at a central location thereof, including a closed container, said closed container containing said ignition means and having a recess formed in a portion thereof facing said second structural component, wherein said initiator means in said second structural component extends into the recess of said closed container, including an inner annular screen filter pack positioned in said inner toroidal chamber in surrounding relation with said gas generant composition therein, said inner screen pack being operative to remove particulate matter from the inflation gas, including an annular retaining disk for holding said gas generant composition and said inner screen filter pack in said inner toroidal chamber away from said second structural component to facilitate joining of said second structural component to said first structural component, including an outer annular screen filter pack positioned in said outer toroidal chamber against the inner surface of the outer one of said three concentric cylinders, said outer screen filter pack being operative to remove particulate matter from and to cool the inflation gas, and including an annular deflector ring positioned between said outer annular screen filter pack and the outer surface of the intermediate one of the three concentric cylinders, said deflector ring having a length that is at least as long as said intermediate concentric cylinder and being positioned at one end in contacting relation with said common wall means, the other end of said deflector ring having port holes therein for the passage of inflation gas, said deflector ring being operative to deflect gases exiting the inner toroidal chamber toward the end thereof having port holes therein.

* * * * *